United States Patent
Ito (10) Patent No.: US 6,662,426 B2
(45) Date of Patent: Dec. 16, 2003

(54) METHOD FOR MANUFACTURING LOOP HANGER FOR SEAT BELT (75) Inventor: Tadao Ito, Iwata (JP)

(73) Assignee: Enshu Co. Ltd., Shizuoka-Ken (JP)

( * ) Notice: Subject to any disclaimer, the term of this patent is extended or adjusted under 35 U.S.C. 154(b) by 123 days.

(21) Appl. No.: 09/894,664

(22) Filed: Jun. 28, 2001

(65) Prior Publication Data

US 2002/0000717 A1 Jan. 3, 2002

(30) Foreign Application Priority Data

Jun. 30, 2000 (JP) ..................... P2000-199851
Dec. 27, 2000 (JP) ..................... P2000-398696

(51) Int. Cl.[7] ............ B23P 25/00; B23P 13/04
(52) U.S. Cl. .......... 29/527.4; 29/527.2; 29/559
(58) Field of Search ............. 29/527.4, 529.2, 29/559; 280/808, 807; 24/197, 265 BC, 265 GC, 578.15, 163 R; 297/468, 483

(56) References Cited

U.S. PATENT DOCUMENTS

| 3,981,052 A | | 9/1976 | Pilarski | |
|---|---|---|---|---|
| 5,403,038 A | * | 4/1995 | McFalls | 280/808 |
| 5,899,499 A | | 5/1999 | Ito | |
| 6,324,730 B1 | * | 12/2001 | Iseki | 24/197 |

FOREIGN PATENT DOCUMENTS

| DE | 31 44 527 | 5/1983 |
|---|---|---|
| EP | 0 078 940 | 5/1983 |
| EP | 0 689 973 | 1/1996 |
| JP | 59-150451 | 10/1984 |
| JP | 4-113257 | 10/1992 |
| JP | 08-156741 | 6/1996 |
| JP | 09-066797 | 3/1997 |
| JP | 09-164907 | 6/1997 |
| JP | 11-170970 | 6/1999 |
| JP | 2000-135967 | 5/2000 |
| JP | 2000 296579 | 10/2000 |
| JP | 2000-296759 | 10/2000 |
| JP | 2000-318573 | 11/2000 |

* cited by examiner

Primary Examiner—John C. Hong
(74) Attorney, Agent, or Firm—Kilpatrick Stockton LLP

(57) ABSTRACT

A loop hanger for a seat belt (10) which slidably hangs a seat belt webbing (S) is provided with a base member (20) made of a metal plate and having a slot (21) through which the seat belt webbing (S) is moved, wherein the slot (21) is constituted with a long side portion (21a) extending in a generally horizontal direction and a pair of left and right short side portions (21b) communicating with left and right end portions of the long side portion (21a) and extending downwardly, a portion of the base member (20) surrounded by the long side portion (21a) and the pair of short side portions (21b) is curved smoothly from a side of the long side portion (21a) in a generally C-shaped sectional configuration, and a curved face (21f) formed by curving the portion of the base member (20) serves as a portion (20a) through which the seat belt webbing (S) is turned back. Accordingly, anti-gum up property can be improved largely.

4 Claims, 12 Drawing Sheets

METHOD FOR MANUFACTURING LOOP HANGER FOR SEAT BELT

BACKGROUND OF THE INVENTION

1. Field of the Invention

The present invention relates to a loop hanger for a seat belt which slidably supports a seat belt webbing (webbing belt) so as to turn over the seat belt at its intermediate portion, the seat belt being provided such that it can be pulled out in an ordinary situation of a vehicle and it can be prevented from being pulled out in an emergency situation of the vehicle, for example, like a three-point seat belt system for an automobile, and a method for manufacturing the same.

2. Description of the Related Art

In recent years, in order to protect an occupant of an automobile at a time of a vehicle collision, a three-point type seat belt which holds the beast of an occupant in a manner extending from the waist of the occupant to his/her one shoulder has been proposed in addition to a two-point type seat belt which holds the waist of the occupant.

Figure 3:
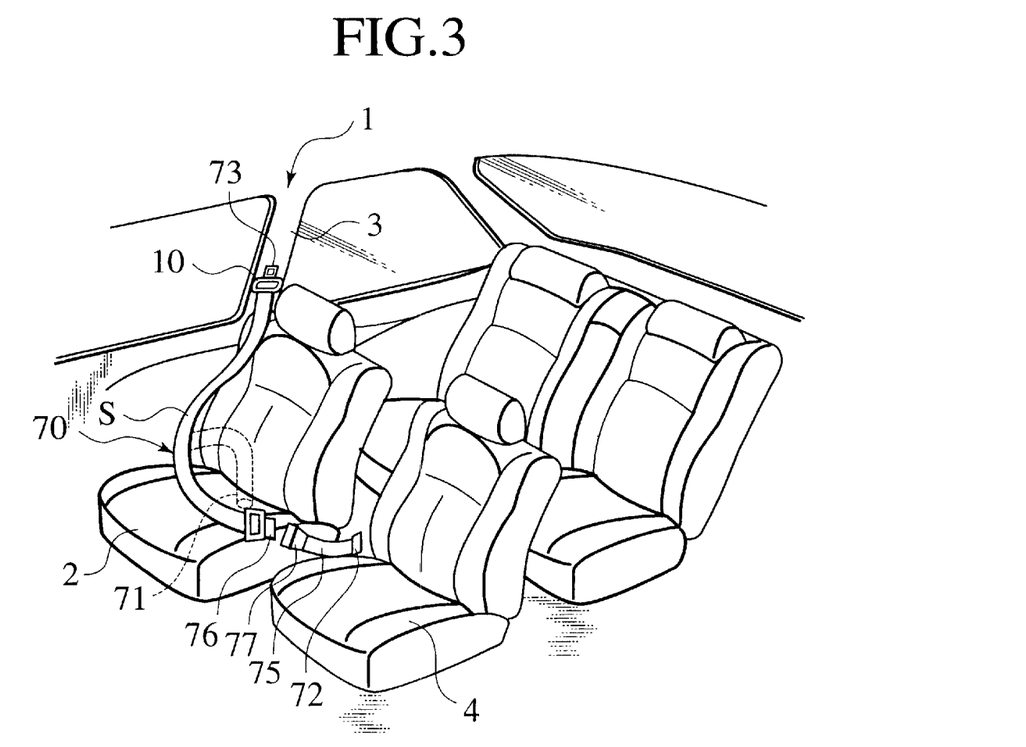
FIG. 3 is a perspective view for explaining an entire structure of a three point type seat belt.

Prior to specific explanations to the Related Art, a general and basic structure of a three-point seat belt 70 capable of using a loop hanger according to the invention by referring to FIG. 3 which is a perspective view of an interior of an automobile 1, is explained. Incidentally, the tree-point seat belt 70 is provided at each of front seats and rear seats. However, an example of a seat belt system provided at a driver's seat 2 will be explained below for simplification of explanation.

The tree-point type seat belt 70 is extended so as to reach three points of a first anchor 71 provided at a lower portion of a center pillar 3, a second anchor 72 provided on a portion of a floor positioned between the driver's seat 2 and a front passenger's seat 4, and a third anchor 73 provided at an upper portion of the center pillar 3. The three-point type seat belt 70 comprises a webbing belt or a seat belt webbing S, one end thereof being mounted to the first anchor 71 and the other end being taken up or retracted in a retractor (not shown), and a fixing belt 75, one end thereof being mounted to the second anchor 72 and the other end having a buckle device 77. Also, a tongue portion or plate 76 which is locked to the buckle device 77 is provided at an intermediate portion of the webbing belt S.

Figure 1:
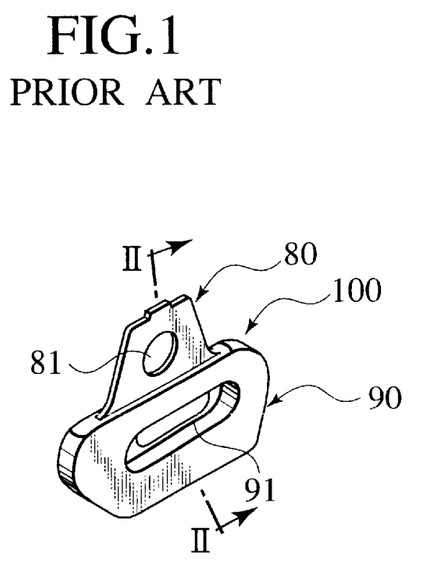
FIG. 1 is a perspective view showing a loop hanger for a three point type seat belt in a conventional art.

FIG. 1 is a perspective view of a conventional loop hanger for a seat belt 100 mounted to the third anchor 73. The loop hanger for a seat belt 100 is provided with a base member 80 which is made of a steel plate (metal) and which has a bolt passing-through hole 81 for mounting the loop hanger 100 to the third anchor 73 through a bolt and a base slot 82 (refer to FIG. 2) through which the webbing belt S is moved in the loop hanger 100 in a sliding manner, and the periphery of the base slot 82 of the base member 80 is entirely covered with a cover member 90 made of synthetic resin, which is insert-molded.

Figure 2:
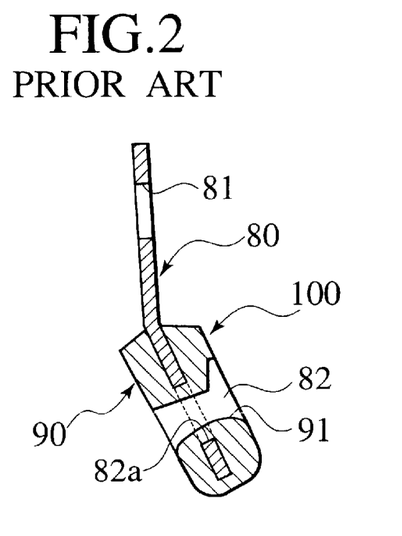
FIG. 2 is a sectional view taken along arrow II—II in FIG. 1.

This cover member 90 covers an edge portion 82a of the base slot 82 to form a slot 91 through which the webbing belt S is slidably moved along the edge portion 82a of the base slot 82. That is, the webbing belt S is turned back at a lower edge face portion of the slot 91 and it can be pulled out from/taken up in the retractor.

However, since the slot 91 is formed by covering the edge portion 82a of the base slot 82 with the cover member 90 which is made of synthetic resin and which is insert-molded, the slidability of the webbing belt S is apt to lower according to reduction of anti-gum up property.

SUMMARY OF THE INVENTION

The present invention has been made to solve the above problem and an object thereof is to provide a loop hanger for a seat belt which can be maintained with the slidability of the webbing belt without influenced by reduction of anti-gum up property and which can reduce fraction defective or reduce a occurrence ratio of inferior goods, and a method for manufacturing the same.

To achieve the object, according to a first aspect of the present invention, there is provided a loop hanger for a seat belt (10) which slidably hangs a seat belt webbing (S), comprising a base member (20) made of a metal plate and having a slot (21) through which the seat belt webbing (S) is moved, wherein the slot (21) is constituted with a long side portion (21a) extending in a generally horizontal direction and a pair of left and right short side portions (21b) communicating with left and right end portions of the long side portion (21a) and extending downwardly, a portion of the base member (20) surrounded by the long side portion (21a) and the pair of short side portions (21b) is curved smoothly from a side of the long side portion (21a) in a generally C-shaped sectional configuration, and a curved face (21f) formed by curving the portion of the base member (20) serves as a portion (20a) through which the seat belt webbing (S) is turned back.

Therefore, according to the first aspect of the present invention structured in the above manner, since the base member (20) is structured such that at least the portion (20a) through which the seat belt webbing (S) is turned back is formed integrally with the base member (20) so as to curve smoothly in a generally C-shaped sectional configuration, face pressure acting upon the seat belt webbing (S) can be reduced, thereby improving durability of the seat belt webbing (S), and the thickness of the base member (20) can be reduced, thereby achieving weight-reduction and cost-reduction.

Also, since the base member (20) is made of a metal plate and the portion (20a) through which the seat belt webbing (S) is turned back is formed in a curved face so as to curve smoothly in a generally C-shaped sectional configuration, the loop hanger for a seat belt can be maintained with the slidability of the webbing belt without influenced by reduction of anti-gum up property.

According to a second aspect of the invention, there is provided a loop hanger for a seat belt (10) which slidably hangs a seat belt webbing (S), comprising a base member (20) made of a metal plate and having a slot (21) through which the seat belt webbing (S) is moved; and a cover member (30) which covers a portion of the base member (20) other than at least a portion (20a) of the base member (20) through which the seat belt webbing (S) is turned back, wherein the slot (21) of the base member (20) is constituted with a long side portion (21a) extending in a generally horizontal direction and a pair of left and right short side portions (21b) communicating with left and right end portions of the long side portion (21a) and extending downwardly, a portion of the base member (20) surrounded by the long side portion (21a) and the pair of short side portions (21b) is curved smoothly from a side of the long side portion (21a) in a generally C-shaped sectional configuration, and a curved face (21f) formed by curving the portion of the base member (20) serves as a portion (20a) through which the seat belt webbing (S) is turned back, and wherein the cover member (20) is provided so as to cover a portion of the base member (20) other than at least the portion (20a) through which the seat belt webbing (S) is turned back and which is formed in a generally C-shaped sectional configuration.

In addition to the above operation and effect, since the cover member (30) is formed so as to cover the portion of the base member (20) other than the portion (20a) through which the seat belt webbing (S) is turned back, the seat belt webbing (S) directly slides on the metal plate-made portion (20a) with the generally C-shaped sectional configuration through which the seat belt webbing (S) is turned back, so that the loop hanger for a seat belt can be maintained with the slidability of the webbing belt without influenced by reduction of anti-gum up property.

According to a third aspect of the invention, there is provided a loop hanger for a seat belt according to the first or second aspect, wherein the center of curvature of the curved face (21f) with the generally C-shaped sectional configuration constituting the portion (20a) through which the seat belt webbing (S) is turned back is positioned on a side of the center of the thickness of the base member (20).

Therefore, according to the third aspect of the invention, since the center of curvature of the curved face (21f) with the generally C-shaped sectional configuration constituting the portion (20a) through which the seat belt webbing (S) is turned back is positioned on the side of the center of the thickness of the base member (20).

According to a fourth aspect of the invention, there is provided a loop hanger for a seat belt according to any one of the first to third aspects, wherein, regarding the slot (21) of the basis member (20), a coarse surface portion (20c) is formed on the portion (20a) through which the seat belt webbing (S) is turned back and which is formed in the generally C-shaped sectional configuration.

Since the coarse surface portion (20c) is formed on the metal plate-made portion (20a) with the generally C-shaped sectional configuration through which the seat belt webbing (S) is turned back, the seat belt webbing (S) slides on the coarse surface portion (20c) directly.

According to a fifth aspect of the invention, there is provided a loop hanger for a seat belt according to any one of the first to fourth aspects, wherein reinforcement ribs (R) are provided on both left and right sides of the slot (21) of the base member (20).

In the above construction according to the fifth aspect of the invention, since the reinforcement ribs (R) are provided on both the left and right sides of the slot (21) on the base member (20), both portions of the base member (20) which are positioned on the both sides of the slot (21) can be improved in strength. Accordingly, even when the seat belt webbing (S) is moved to one of the both sides and pressure of the webbing (S) is concentrated on the one, safety of the seat belt webbing (S) can be improved.

According to a sixth aspect of the invention, there is provided a loop hanger for a seat belt according to the fifth aspect, wherein the reinforcement ribs (R) are formed on the both left and right sides of the slot (21) of the base member (20) along an opening edge, and a sectional configuration of each reinforcement rib has a generally semi-circular sectional configuration projecting on one side surface of the base member (20).

According to the sixth aspect of the invention, since the reinforcement ribs (R) are provided on the both edge sides of the slot (21) along the opening edge and each rib (R) projects on one side surface of the base member (20) in a semi-circular or semi-spherical sectional configuration, the seat belt webbing (S) can be rounded along a direction in which the seat belt webbing (S) is turned back so that the seat belt webbing (S) can be prevented from being injured.

According to a seventh aspect of the invention, there is provided a loop hanger for a seat belt according to the fifth aspect, wherein the reinforcement ribs (R) are formed on the both left and right sides of the slot (21) of the base member (20) along an opening edge, and a sectional configuration of each reinforcement rib has a generally circular sectional configuration projecting on both side surfaces of the base member (20).

Since each reinforcement rib (R) is provided on both side surfaces of the base member (20) so as to project in a circular or spherical sectional configuration, the seat belt webbing (S) can be rounded along a direction in which the seat belt webbing (S) is turned back so that the seat belt webbing (S) can be prevented from being injured and the strength thereof can further be improved.

According to an eighth aspect of the invention, there is provided a method for manufacturing a loop hanger for a seat belt (10) which slidably hangs a seat belt webbing (S), wherein, after a slot (21) which comprises a long side portion (21a) extending in a generally horizontal direction and a pair of left and right short side portions (21b) communicating with left and right end portions of the long side portion (21a) and extending downwardly, and through which the seat belt webbing (S) is moved is pierced in a material member made of a metal plate to form a base member (20) made of the metal plate, a portion of the base member (20) which is surrounded by the long side portion (21a) and the pair of left and right short side portions (21b) is curved smoothly from the long side portion (21a) side in a generally C-shaped sectional configuration to form a curved face (21f) and a portion (20a) through which the seat belt webbing (S) is turned back is formed by the curved face (21f); and the center of curvature of the curved face 21f constituting the portion (20a) through which the seat belt webbing (s) is turned back is moved to a side of the center of the thickness of the base member (20).

According to a ninth aspect of the invention, there is provided a method for manufacturing a loop hanger for a seat belt (10) which slidably hangs a seat belt webbing (S), wherein, after a slot (21) which comprises a long side portion (21a) extending in a generally horizontal direction and a pair of left and right short side portions (21b) communicating with left and right end portions of the long side portion (21a) and extending downwardly, and through which the seat belt webbing (S) is moved is pierced in a material member made of a metal plate to form a base member (20) made of the metal plate, a portion of the base member (20) which is surrounded by the long side portion (21a) and the pair of left and right short side portions (21b) is curved smoothly from the long side portion (21a) in a generally C-shaped sectional configuration to form a curved face (21f) and a portion (20a) through which the seat belt webbing (S) is turned back is formed by the curved face (21f); the center of curvature of the curved face (21f) constituting the portion (20a) through which the seat belt webbing (S) is turned back is moved to a side of the center of the thickness of the base member (20) to form the base member (20) which is provided with the portion (20a) through which the seat belt webbing (S) is turned back; and a cover member (30) is provided so as to cover a portion of the base member (20) other than at least the portion (20a) through which the seat belt webbing (S) is turned back.

According to a tenth aspect of the invention, there is provided a method for manufacturing a loop hanger for a seat belt (10) which slidably hangs a seat belt webbing (S), wherein, after a slot (21) which comprises a long side portion (21a) extending in a generally horizontal direction and a pair of left and right short side portions (21b) communicating with left and right end portions of the long side portion (21a) and extending downwardly, and through which the seat belt webbing (S) is moved is pierced in a material member made of a metal plate to form a base member (20) made of the metal plate, the center of curvature of a curved face (21f) to be formed in the next step is moved to a side of the center of the thickness of the base member (20) in advance; and a portion of the base member (20) which is surrounded by the long side portion (21a) and the pair of left and right short side portions (21b) is curved smoothly from the long side portion (21a) in a generally C-shaped sectional configuration to form a curved face (21f) and a portion (20a) through which the seat belt webbing (S) is turned back is formed by the curved face (21f).

According to an eleventh aspect of the invention, there is provided a method for manufacturing a loop hanger for a seat belt (10) which slidably hangs a seat belt webbing (S), wherein, after a slot (21) comprising a long side portion (21a) extending in a generally horizontal direction and a pair of left and right short side portions (21b) communicating with left and right end portions of the long side portion (21a) and extending downwardly is formed in material made of a metal plate to form a base member (20) made of the metal plate, the center of curvature of a curved face (21f) to be formed in the next step is moved to a side of the center of the thickness of the base member (20) in advance; a portion of the base member (20) which is surrounded by the long side portion (21a) and the pair of left and right short side portions (21b) is curved smoothly from the long side portion (21a) in a generally C-shaped sectional configuration to form a curved face (21f) and a portion (20a) through which the seat belt webbing (S) is turned back is formed by the curved face (21f); and a cover member (30) is provided so as to cover a portion of the base member (20) other than at least the portion (20a) through which the seat belt webbing (S) is turned back.

According to each of the eighth to eleventh aspects of the invention, since the portion (20a) through which the seat belt webbing (S) is turned back is formed in a curved face having a large radius of curvature such that the seat belt webbing (S) is smoothly curved, the face pressure acting upon the seat belt webbing (S) can be made small, so that the durability of the seat belt webbing (S) can be improved and the thickness of the base member (20) can be reduced, thereby decreasing weight and manufacturing cost.

Also, since the base member (20) is made of a metal plate and the portion (20a) through which the seat belt webbing (S) is turned back is formed in a curved face so as to curve smoothly in the generally C-shaped sectional configuration, the loop hanger for a seat belt can be maintained with the slidability of the webbing belt without influenced by reduction of anti-gum up property.

BRIEF DESCRIPTION OF THE
ACCOMPANYING DRAWINGS

The above and further objects and novel features of the present invention will more fully appear from the following detailed description when the same is read in conjunction with the accompanying drawings, in which.

DETAILED DESCRIPTION OF THE
PREFERRED EMBODIMENTS

Embodiments of the present invention will be explained below with reference to the accompanying drawings. Like members are designated by like reference characters.

Figure 4:
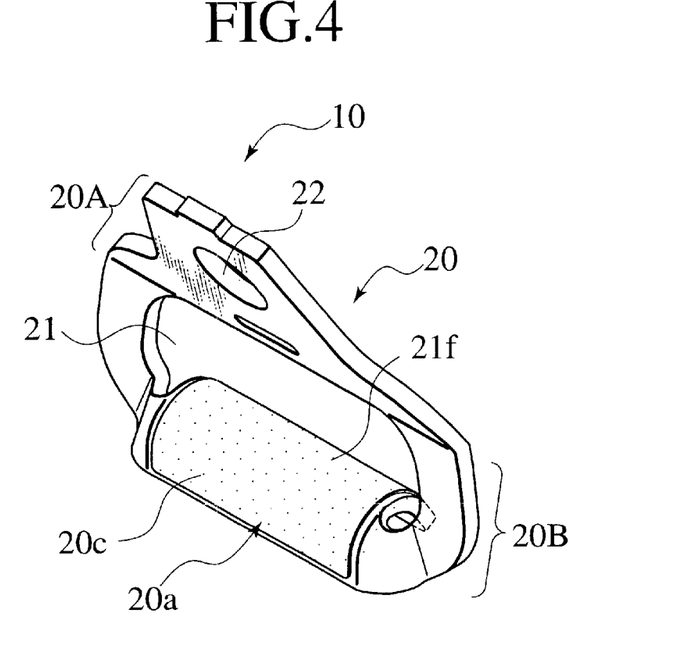
FIG. 4 is a perspective explanatory view of a loop hanger for a seat belt according to a first embodiment of the present invention.

As shown in FIG. 4, a loop hanger for a seat belt 10 illustrated as a first embodiment is to hang a seat belt webbing S slidably and it can be mounted with a cover member (not shown) attachably/detachably structured, as necessary. The loop hanger 10 can be constituted with a base member 20 made of a metal plate and having a slot 21, which is provided with a portion 20a which is formed in a generally C-shaped sectional configuration and through which the seat belt webbing S is turned back.

Figure 5:
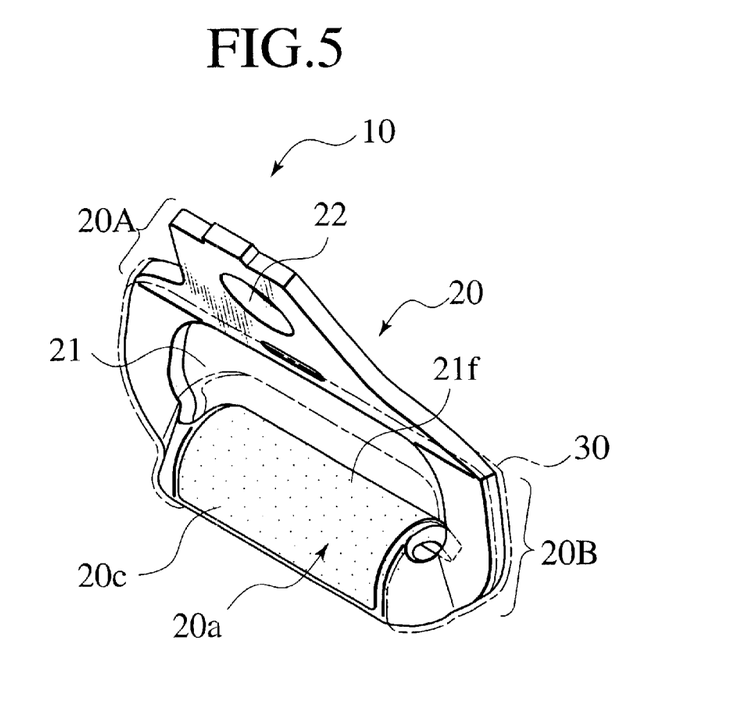
FIG. 5 is a perspective explanatory view of a loop hanger for a seat belt according to a second embodiment of the present invention.

As shown in FIG. 5 a loop hanger for a seat belt 10 illustrated as a second embodiment is constituted with a base member 20 made of a metal plate and having a slot 21, which is provided with a portion 20a which is formed in a generally C-shaped sectional configuration and through which the seat belt webbing S is turned back, and a cover member 30 which covers a portion of the base member 20 other than at least the portion 20a which is formed in a generally C-shaped sectional configuration and through which the seat belt webbing S is turned back.

The structure of the base member 20 which is made of a metal plate and which has the same structure common to the first and second embodiments mentioned above.

In these embodiments, the base member 20 is formed by punching a high tensile steel blank having the thickness of about 3 mm to conduct press working on the punched blank, and it comprises a mounting portion 20A and a seat belt holding portion 20B, as shown in FIGS. 4 and 5. The mounting portion 20A is provided with a mounting hole 22 applied for mounting the loop hanger for a seat belt 10 to a center pillar 3 of a vehicle body, and the seat belt holding portion 20B is provided with a slot 21 through which the seat belt webbing S is slidably moved, as mentioned above.

Figure 7:
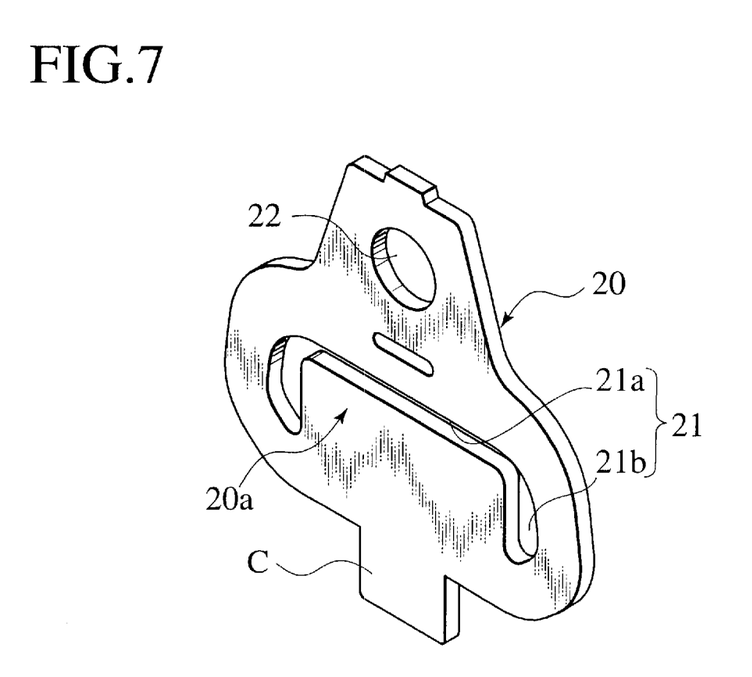
FIG. 7 is a perspective explanatory view showing a piercing step of the manufacturing steps.
Figure 18:
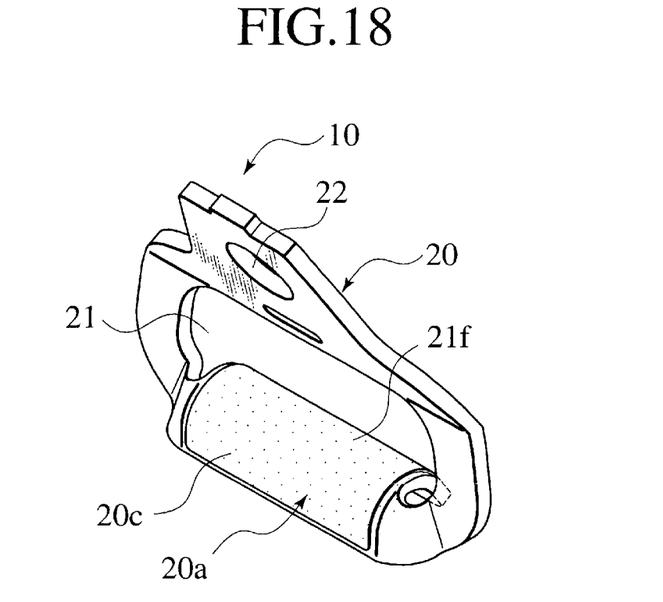
FIG. 18 is a perspective explanatory view showing a bending step of the manufacturing steps.
Figure 19:
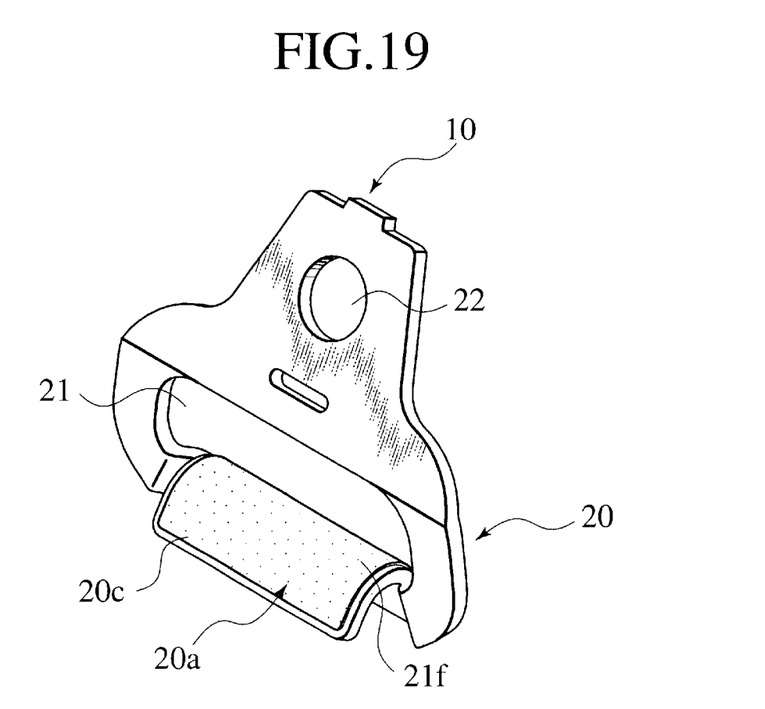
FIG. 19 is a perspective explanatory back view showing the bending step of the manufacturing steps.

As shown in FIG. 7, the slot 21 is constituted with a long side portion 21a extending in a generally horizontal direction and a pair of short side portions 21b which communicate with left and right end portions of the long side portion 21a and extend downwardly. Referring back to FIGS. 4 and 5, a portion (denoted as numeral "21f") of the base member 20 which is surrounded by the long side portion 21a and the short side portions 21b is curved in smoothly a generally C-shaped sectional configuration from the side of the long side portion 21a, thereby forming the curved face 21f serving as the portion 20a through which the seat belt webbing S is slidingly turned back. Furthermore, the center of curvature of the curved face 21f with the generally C-shaped sectional configuration which constitutes the portion 20a through which the seat belt webbing S is turned back is positioned at the center side of the thickness of the base member 20 in a direction of thickness of the base member 20. Furthermore, a coarse surface portion 20c (as shown in FIGS. 18 and 19 as plurality of dots) is formed on the portion 20a through which the seat belt webbing S is turned back.

Figure 22:
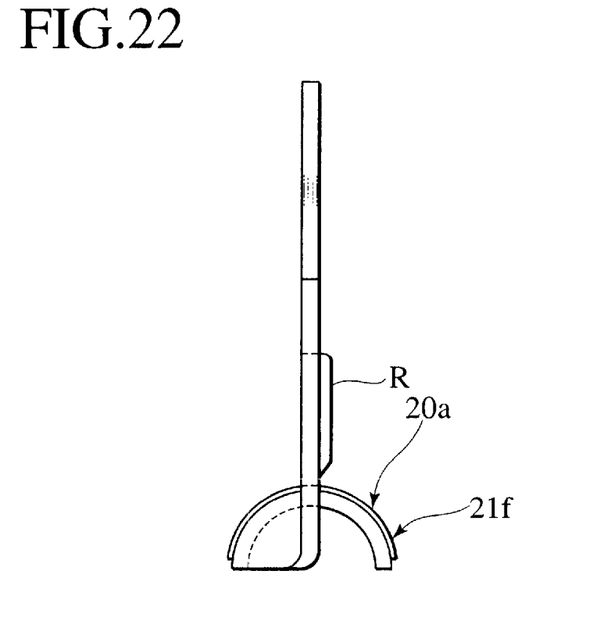
FIG. 22 is an explanatory sectional view showing a step for moving the center of curvature.
Figure 23:
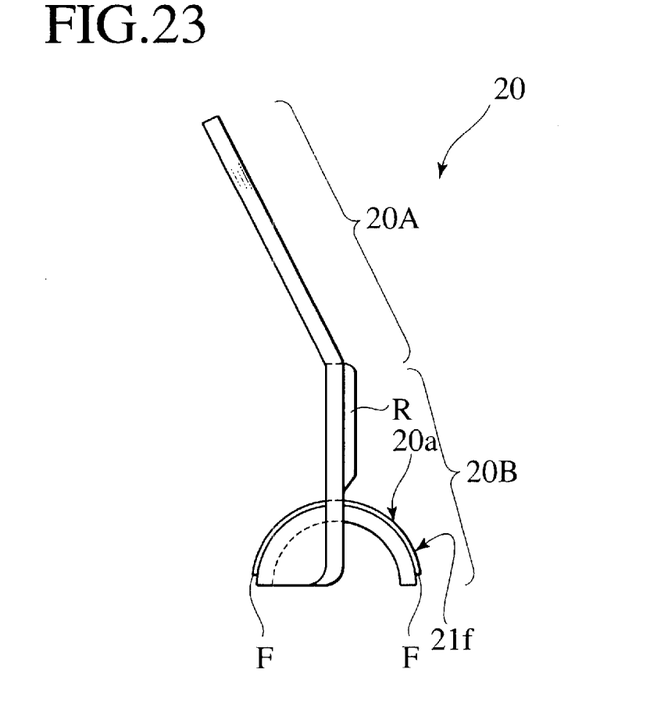
FIG. 23 is an explanatory sectional view showing a step a bending step.

Also, reinforcement ribs R (shown in FIGS. 22 and 23) are provided on the base member 20 on both left and right sides of the slot 21. The reinforcement ribs R are formed on the both left and right sides of the slot 21 along the opening edge thereof, and the ribs R are provided on one side surface of the base member 20 so as to project in a semi-spherical or semi-circular sectional configuration. Alternatively, the ribs R may be provided so as to project on both side surfaces in a generally spherical or circular sectional configuration.

Next, methods for manufacturing the base members 20 made of a metal plate which have been explained in the first and second embodiments will be explained. A method for manufacturing a relatively small number of base members 20 made of a metal plate will first be explained with reference to FIGS. 6 to 19.

The method comprises the following steps in combination.

Figure 6:
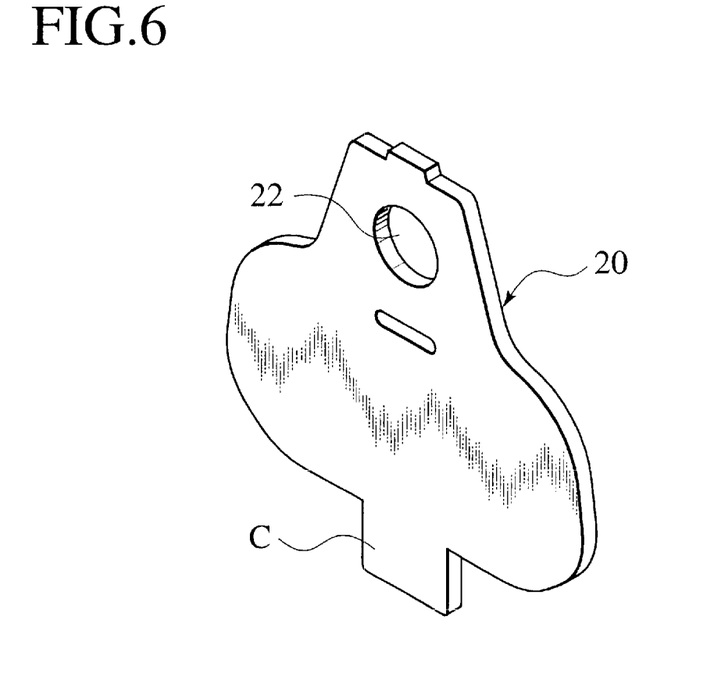
FIG. 6 is a perspective explanatory view showing a piercing and trimming step of steps for manufacturing a relatively small number of base members 20 made of a metal plate.
Figure 8:
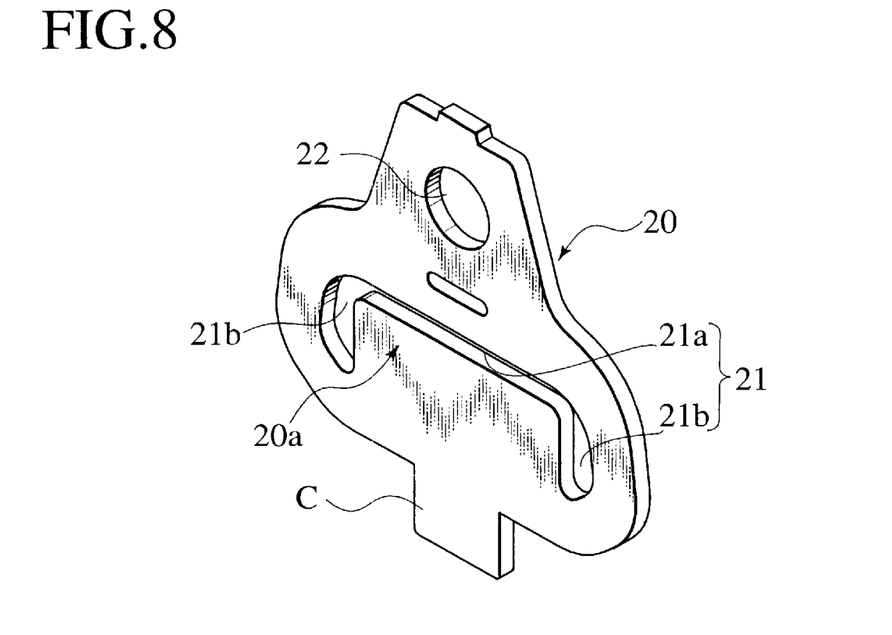
FIG. 8 is a perspective explanatory view showing a chamfering step of the manufacturing steps.
Figure 9:
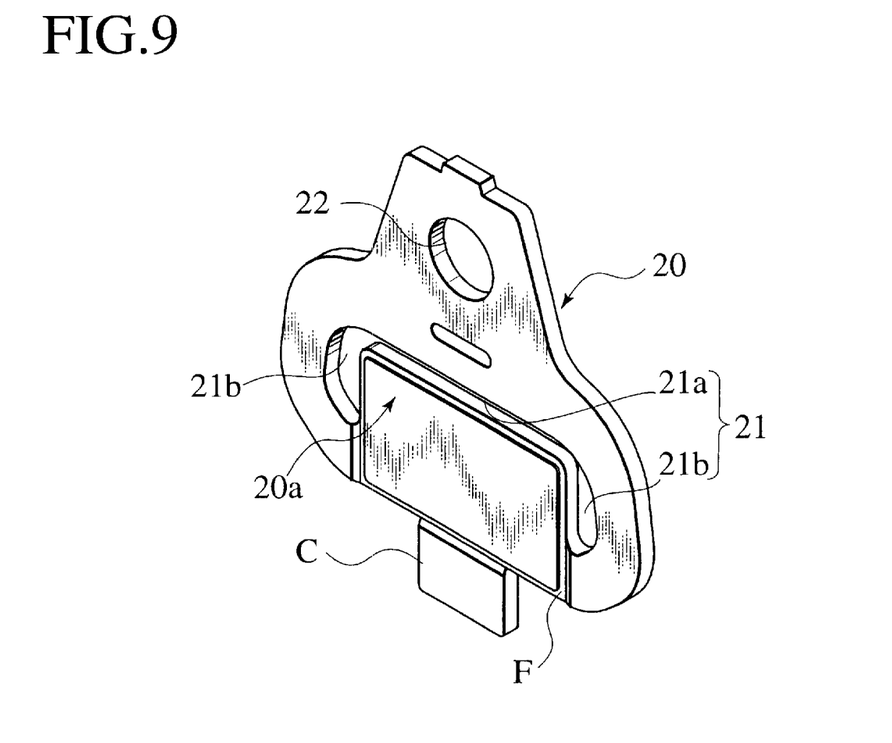
FIG. 9 is a perspective explanatory view showing a squeezing step of the manufacturing steps.
Figure 10:
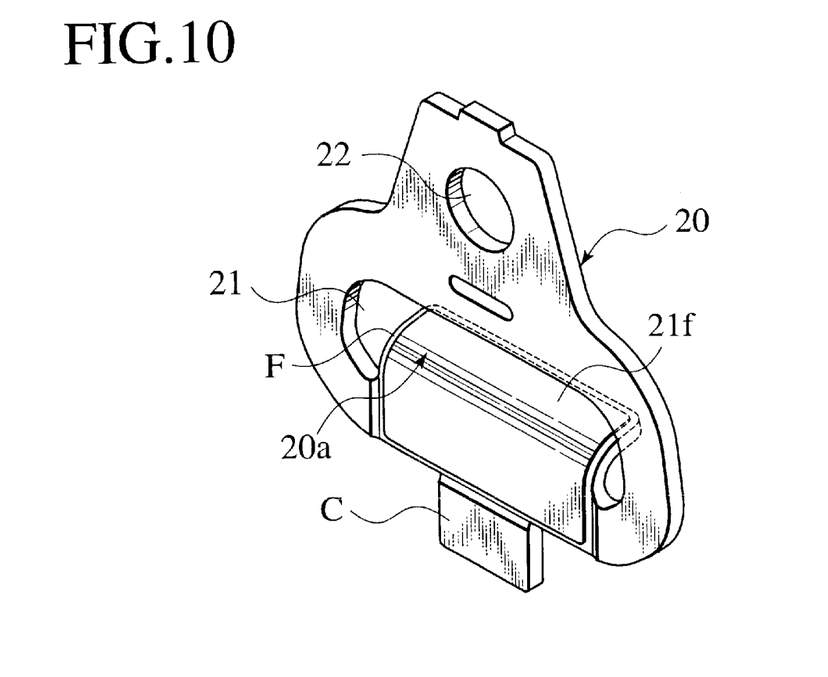
FIG. 10 is a perspective explanatory view showing a first curved face forming step of the manufacturing steps.
Figure 11:
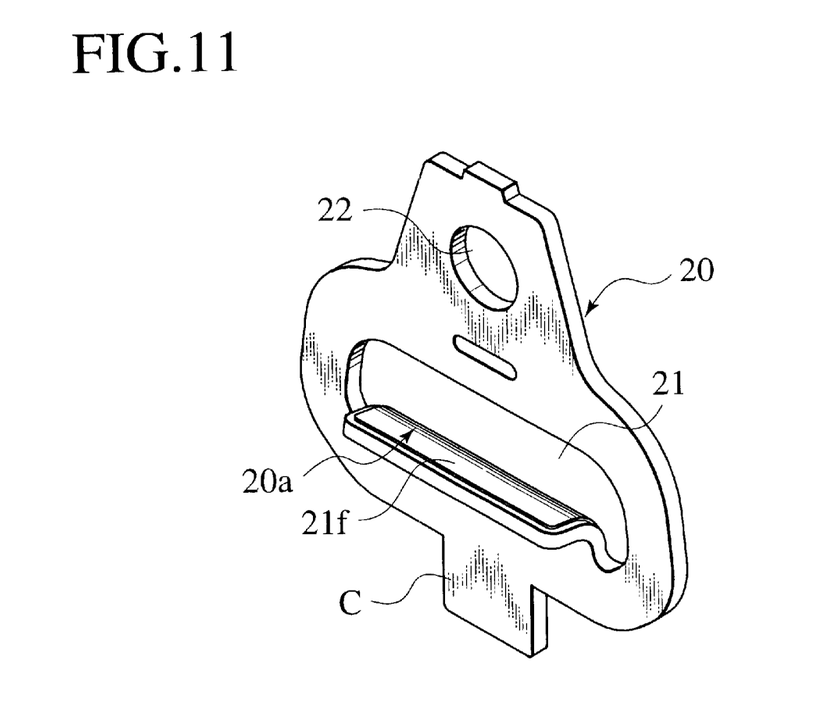
FIG. 11 is a perspective explanatory back view showing the first curved face forming step of the manufacturing steps.
Figure 12:
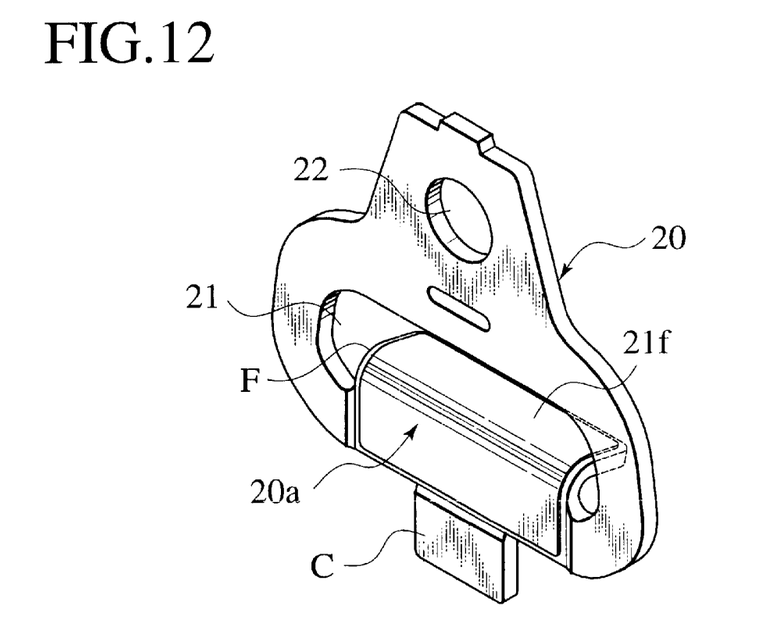
FIG. 12 is a perspective explanatory view showing a second curved face forming step of the manufacturing steps.
Figure 13:
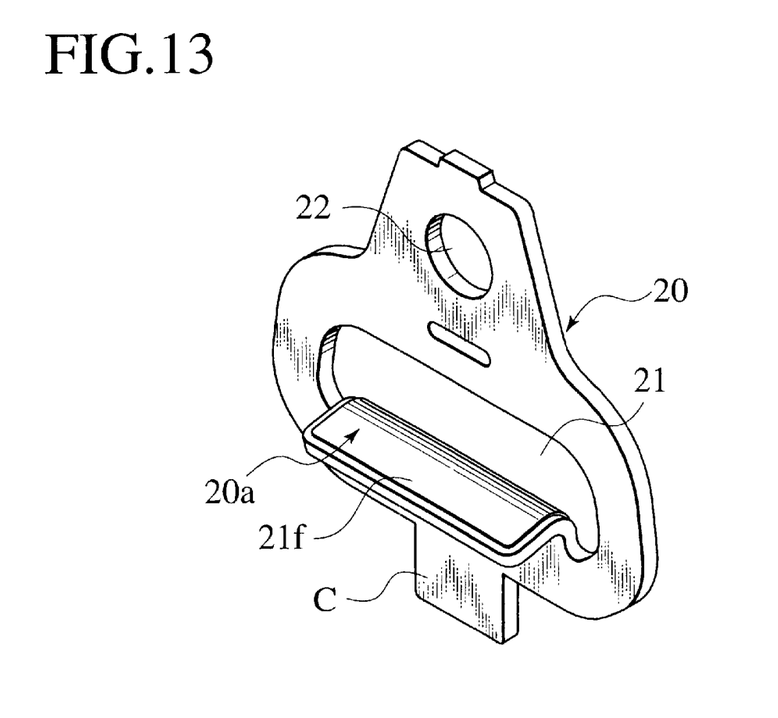
FIG. 13 is a perspective explanatory back view showing the second curved face forming step of the manufacturing steps.
Figure 14:
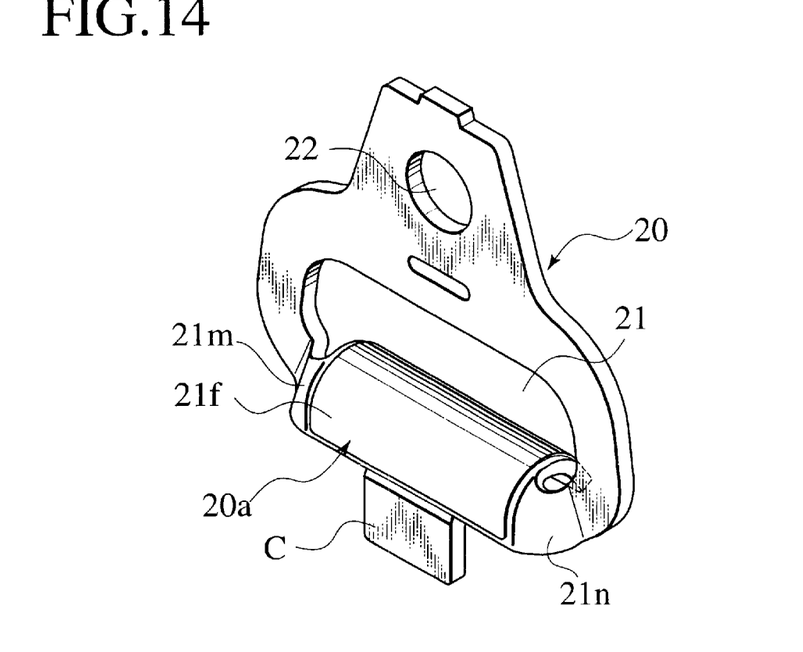
FIG. 14 is a perspective explanatory view showing a center of curvature moving step for moving the center of curvature of the manufacturing steps.
Figure 15:
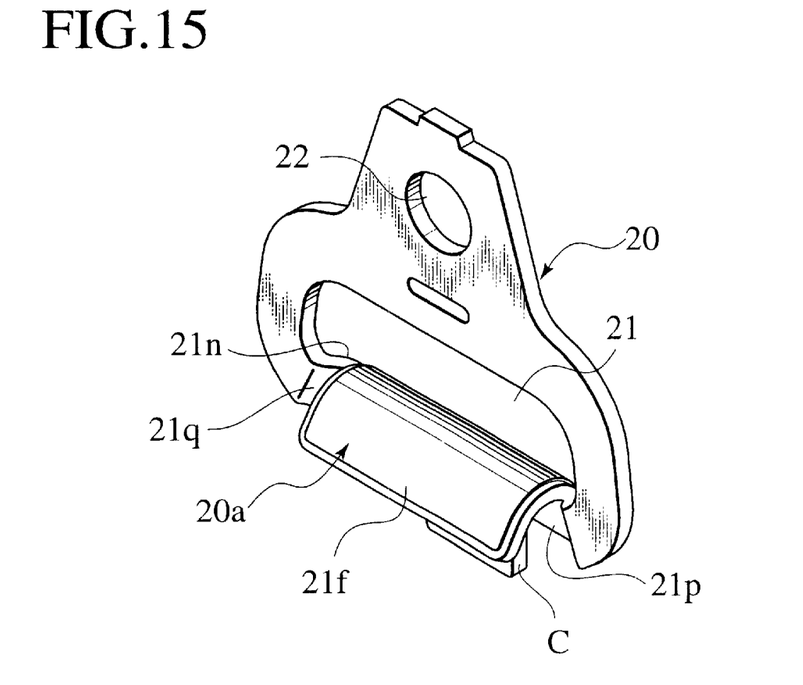
FIG. 15 is a perspective explanatory back view showing the center of curvature moving step of the manufacturing steps.
Figure 16:
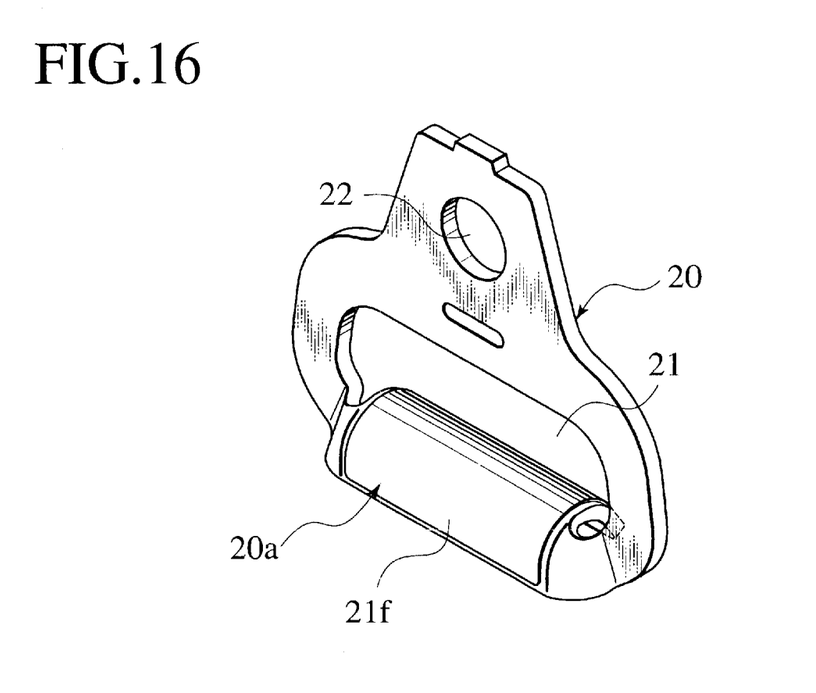
FIG. 16 is a perspective explanatory view showing a trimming and cutting step of the manufacturing steps.
Figure 17:
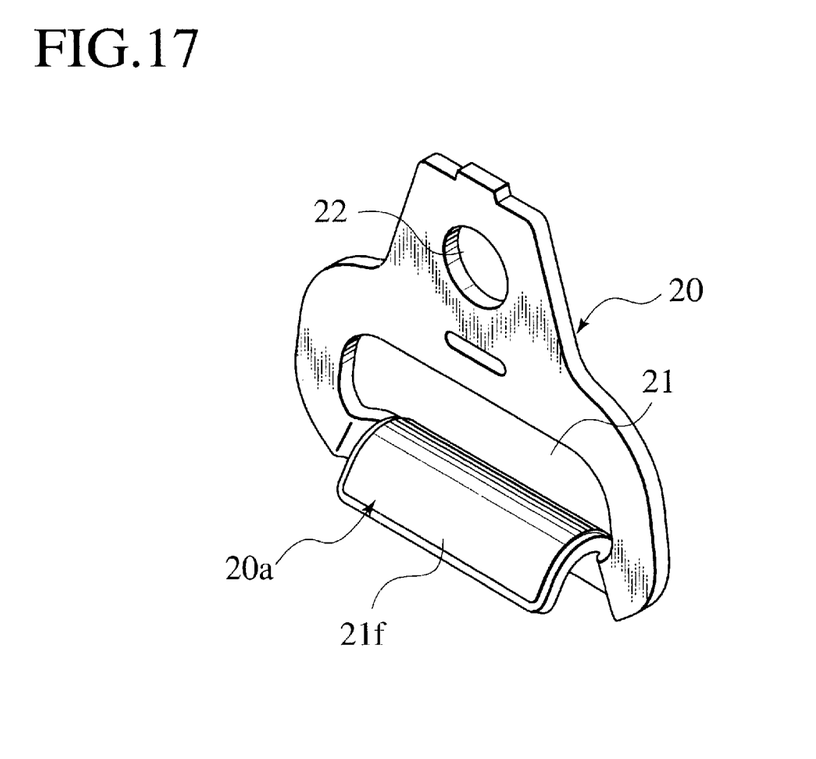
FIG. 17 is a perspective explanatory back view showing the trimming and cutting step of the manufacturing steps.

A piercing and trimming step for cutting off a material member made of a metal plate to a development state of the base member 20 having a clamp portion C by trimming, and for piercing a mounting hole 22 for mounting on a vehicle body side (refer to FIG. 6);

a piercing step for piercing the pierced and trimmed material member to form a slot 21 comprising the long side portion 21a extending in a generally horizontal direction and the pair of left and right short side portions 21b which communicate with both the left and right end of the long side portion 21a to extend downwardly (refer to FIG. 7);

a chamfering step (or stamping step) for chamfering a periphery of the slot 21 (refer to FIG. 8);

a squeezing step (or coining step) for squeezing (or coining) a periphery of the portion 20a through which the seat belt webbing S is turned back and which is constituted with a portion surrounded by the long side portion 21a and the pair of left and right short sides 21b so that the squeezed portion F is made lower than the surface of the base member 20 (refer to FIG. 9);

a first curved face forming step for pressing a free end portion of the portion 20a through which the seat belt webbing S is turned back, which is surrounded by the squeezed portion F formed in the squeezing step, towards a back surface to form the curved face 21f (refer to FIGS. 10 and 11);

a second curved face forming step for further pressing the curved face 21f which has been curved in the first curved face forming step to curve it further (refer to FIGS. 12 and 13);

a center of curvature moving step for moving the center of curvature of the curved face 21f which has been formed in the first and second curved face forming steps to the center of the thickness of the base member 20 by bending lower portions 21m, 21p, 21n and 21q of the base member 20 (refer to FIGS. 14 and 15);

a trimming and cutting step for trimming and cutting the clamp portion C which has been applied for clamping to a final shape of the base member 20 after the center of curvature moving step of the curved face 21f (refer to FIGS. 16 and 17); and a bending step for bending the base member 20 which has been trimmed and cut to the final shape in the trimming and cutting step to a predetermined angle (refer to FIGS. 18 and 19).

Then, a first method applied to a case where a large number of base members 20 made of a metal plate are manufactured will be explained with reference to FIG. 20.

Figure 20:
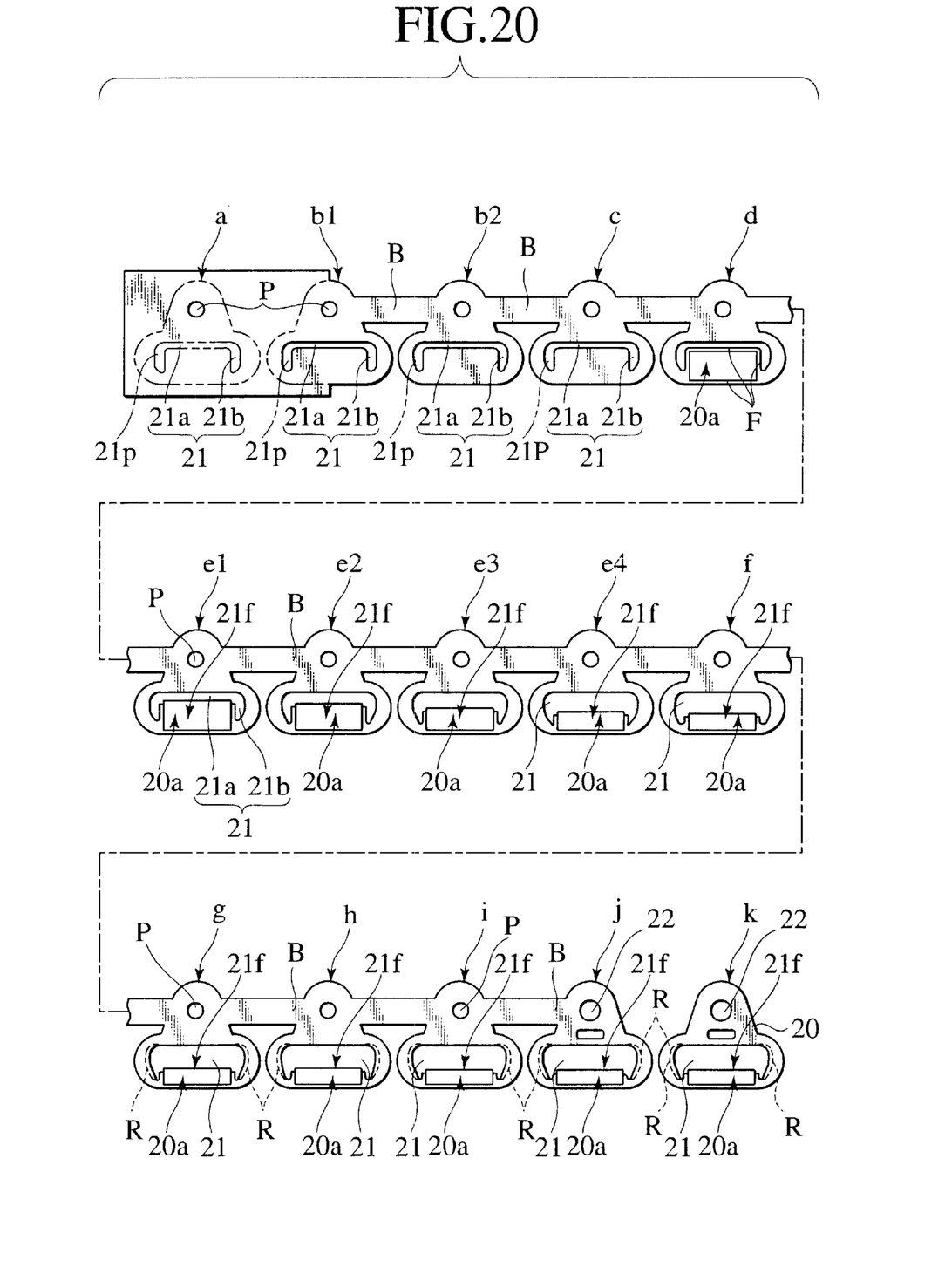
FIG. 20 is a perspective explanatory view showing a process of manufacturing many base members which are made of a metal plate.
Figure 21A:
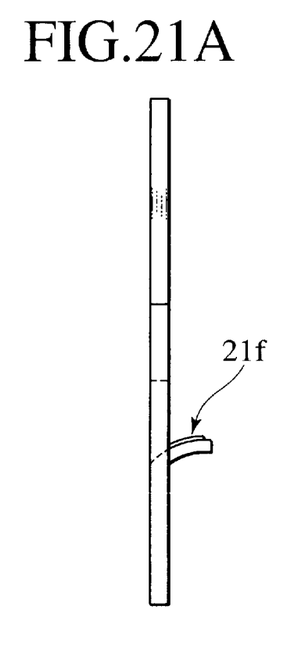
FIG. 21A is an explanatory sectional view showing a first stage of a curved face forming step.
Figure 21B:
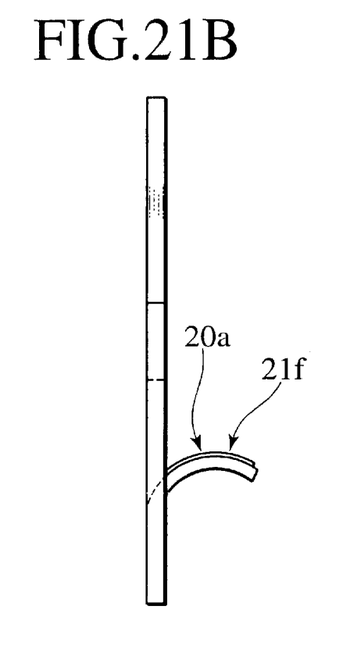
FIG. 21B is an explanatory sectional view showing a second stage of a curved face forming step.
Figure 21C:
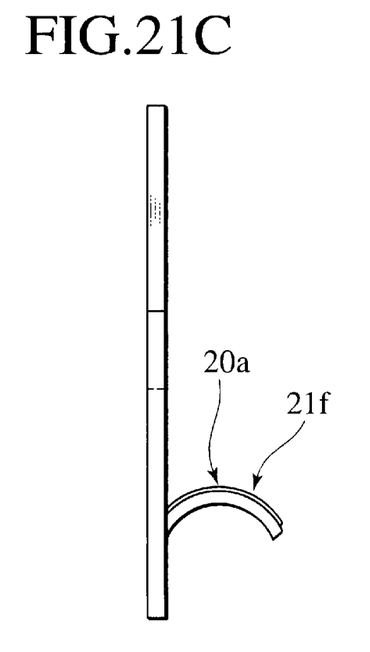
FIG. 21C is an explanatory sectional view showing a third stage of a curved face forming step.
Figure 21D:
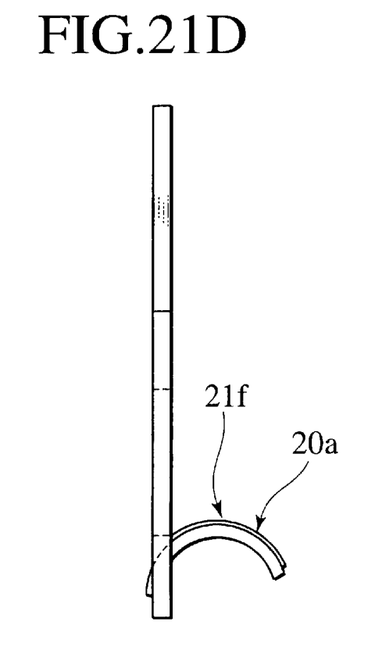
FIG. 21D is an explanatory sectional view showing a fourth stage of a curved face forming step.

The first method comprises the following steps in combination:

a piercing step for piercing a pilot hole p and a slot 21 on a material blank made of a metal plate, the slot 21 comprising a long side portion 21a extending in a generally horizontal direction and a pair of left and right short side portions 21b which communicate with both ends of the long side portion 21a to extend downwardly (refer to "a" in FIG. 20);

a trimming and cutting step for trimming and cutting the pierced material blank to a development state of the base member 20 while a connecting strip portion B for forward feeding (refer to "b1" and "b2" in FIG. 20);

a chamfering step for chambering a periphery of the slot 21 (refer to "c" in FIG. 20);

a squeezing step for squeezing a periphery of the portion 20a through which the seat belt webbing S is turned back and which is constituted with a portion surrounded by the long side portion 21a and the pair of left and right short sides 21b so that the squeezed portion F is made lower than the surface of the base member 20 (refer to "d" in FIG. 20):

a curved face forming step for pressing the portion 20a through which the seat belt webbing S is turned back and which includes the squeezed portion F which has been achieved in the squeezing step sequentially in a stepped manner from the long side portion 21a side to form a curved face 21f bent smoothly in a generally C-shaped sectional configuration (refer to "e1" to "e4" in FIG. 20);

a center of curvature moving step for moving the center of curvature of the curved face 21f which has been formed in the curved face forming step towards the center side of the thickness of the base member 20 (refer to "f" in FIG. 20);

a burring step for forming a burring portion towards a back face of the base member 20 in order to form reinforcement ribs R on both left and right sides of the slot 21 (refer to "g" in FIG. 20);

a forming step for forming the burring portion which has been formed in the burring step in a semi-circular sectional configuration (refer to "h" in FIG. 20);

a bending step for bending the base member 20 to a generally L-shaped sectional configuration via an upper edge portion of the slot 21 of the base member 20 (refer to "i" in FIG. 20);

a mounting hole piercing step for piercing a mounting hole 22 for a loop hanger for a seat belt 10 at a center of the pilot hole P for forward feeding which has been pierced in the piercing step (refer to "j" in FIG. 20); and a cutting step for cutting the connecting strip portion B for forward feeding (refer to "k" in FIG. 20).

Next, a second method applied to a case where a large number of base members 20 made of a metal plate are manufactured will be explained briefly.

In the above first method, subsequent to the curved face forming step for forming the curved face 21f, the center of curvature moving step for moving the center of curvature of the curved face 21f which has been formed in the curved face forming step has been performed. In the second method, however, the center of curvature moving step is performed before the curved face 21f is formed in the curved face forming step.

That is, the center of curvature moving step is performed on the portion 20a through which the seat belt webbing S is turned back and which includes a portion surrounded by the portion F which has been squeezed in the squeezing step in advance such that the center of curvature of the curved face 21f to be formed in the next step is moved towards the center of the thickness of the base member 20.

In addition, in the center of curvature moving step, the center of curvature is moved towards the center of the thickness of the base member 20, and simultaneously the free end portion of the portion 20a through which the seat belt webbing S is turned back and which includes a portion surrounded by the portion F which has been squeezed in the squeezing step is slightly bent in a direction in which it is bent in the curved face forming step performed as the next step, so that forming a curved face which is performed in the next step is facilitated.

Furthermore, in the second method, a curved face is formed by sequentially performing eight stages of the first to eighth curved face forming steps. Thereby, a smooth curved face 21f, reduction of burden on respective dies, size reduction of a pressing device to be used can be achieved.

In the respective steps of the manufacturing method, the curved face forming step for forming the curved face 21f on the portion 20a through which the seat belt webbing S is turned back is completed by sequentially performing four stages of the first curved face forming step to the fourth curved face forming step in the first method, as shown in "e1", "e2", "e3", and "e4" in FIG. 20, or FIGS. 21A to 21D, while the curved face forming step is completed by sequentially performing eight stages of the first curved face forming step to the eighth curved face forming step in the second method. Thereby, a smooth curved face 21f, reduction of burden on respective dies, size reduction of a pressing device to be used can be achieved. Incidentally, the curved face forming step can include two or three stages, or nine or more stages.

Also, it is very important that in the first method, the portion 20a is slightly bent from the long side portion 21a side, thereby obtaining a starting point for forming the curved face 21f in the first curved face forming step, as shown in FIGS. 21A to 21D, while in the second method, the free end portion of the portion 20a through which the seat belt webbing S is turned back is bent slightly in a direction of bending performed in next the curved face forming step, thereby obtaining a starting point for forming the curved face 21f. Therefore, a smooth or beautiful curved face 21f can easily be achieved in the next and subsequent steps.

This curved face 21f is curved so as to slidably contact with the seat belt webbing S in an angle range of 120 to 180°. In view of improvement to maintain with slidability of the webbing belt without to be influenced by reduction of anti-gum up property, it is preferable that the curved face 21f contacts with the seat belt webbing S in an angle range of 130 to 150°.

Furthermore, since the center of curvature of the curved face 21f which has been formed in the above-mentioned curved face forming step is moved towards the center of the thickness of the base member 20 in the center of curvature moving step, the slidability of the webbing belt can be improved largely.

As mentioned above, the reinforcement ribs R are provided on the left and right sides of the slot 21 in the base member 20 along the opening edge of the slot by the burring step and the forming step. Particularly, in this embodiment, each rib R is formed so as to project on one side surface of the base member 20 in a generally semi-spherical or semi-circular sectional configuration. Each rib may be provided so as to project on both side surfaces of the base member 10 in a generally spherical or circular sectional configuration, as necessary.

As mentioned above, the base member 20 is bent from the top portion of the slot 21 in a generally L-shape as viewed from a side by the bending step. The bending may be performed in a direction opposed to the direction of the free end portion of the curved face 21f, as the present embodiment, but it may be performed in the same direction as the free end portion of the curved face 21f.

Also, since the periphery of the slot 21 comprising the long side portion 21a extending in a generally horizontal direction and the pair of short side portions 21b communicating with both the left and right ends of the long side portion 21a to extend downwardly is chamfered in the chamfering step, stress concentrated due to the edge of the periphery can be prevented from acting on the cover member, thereby preventing resin of the cover member from being broken.

Furthermore, since the peripheral portion of the portion 20*a* through which the seat belt webbing S is turned back, which has been formed in the piercing step is squeezed in the squeezing step so that the squeezed portion F is made lower than the surface of the base member 20, the seat belt webbing S can be prevented from riding on the covered resin portion, so that the slidability of the webbing belt can be improved largely, in other wards, the slidability of loop hanger with the webbing belt can be improved largely.

The entire contents of Japanese Patent Application P2000-398696 (filed on Dec. 27, 2000) and P2000-199851 (filed on Jun. 30, 2000) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A method of manufacturing a loop hanger for a seat belt, comprising the steps of:

providing a substantially planar sheet of material which is made of a metal plate;

cutting a substantially U-shaped slot in the sheet of material so as to divide the sheet of material into a body portion and a tongue which is integrally formed with the body portion so that the tongue is also made of the metal plate;

forming the tongue into a substantially arcuate tongue on which the seat belt is slidably turned back; and displacing a portion of the sheet of material adjacent the arcuate tongue away from the plane of the sheet of material in a direction opposite to a distal end of the arcuate tongue, so that substantially a half portion of the arcuate tongue is located to be protruded from one side of the plane of the sheet of material and that another substantially half portion of the arcuate tongue is located to be protruded from the other side of the plane of the sheet of material.

2. A method of manufacturing a loop hanger for a seat belt according to claim 1, further comprising the step of:

coating a cover member to cover the body portion other than the arcuate tongue through which a seat belt webbing of the seat belt is slidably turned back.

3. A method of manufacturing a loop hanger for a seat belt, comprising the steps of:

providing a substantially planar sheet of material which is made of a metal plate;

cutting a substantially U-shaped slot in the sheet of material so as to divide the sheet of material into a body portion and a tongue which is integrally formed with the body portion so that the tongue is also made of the metal plate;

displacing a portion of the sheet of material adjacent the tongue so that the tongue is moved away from the plane of the sheet of material;

forming the tongue into a substantially arcuate tongue on which the seat belt is slidably turned back, wherein substantially a half portion of the arcuate tongue is located to be protruded from one side of the plane of the sheet of material; and substantially another half portion of the arcuate tongue is located to be protruded from the other side of the plane of the sheet of material.

4. A method of manufacturing a loop hanger for a seat belt according to claim 3, further comprising the step of:

coating a cover member to cover the body portion other than the arcuate tongue through which a seat belt webbing of the seat belt is slidably turned back.

\* \* \* \* \*